(No Model.)  C. THOM, Jr.  2 Sheets—Sheet 1.
ELECTRIC TELEGRAPHY.
No. 510,209.  Patented Dec. 5, 1893.
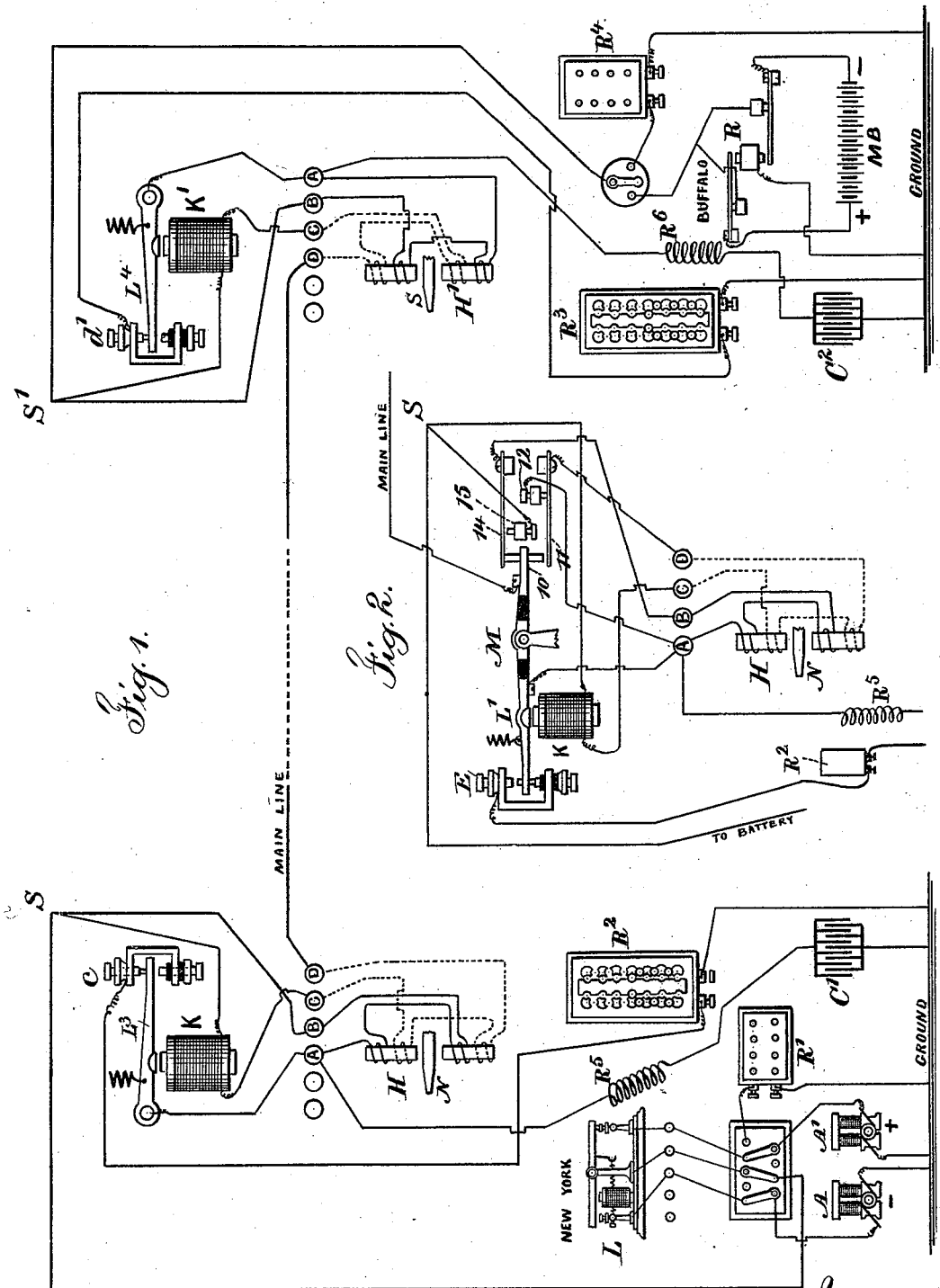

(No Model.)
2 Sheets—Sheet 2.
C. THOM, Jr.
ELECTRIC TELEGRAPHY.
No. 510,209.                     Patented Dec. 5, 1893.
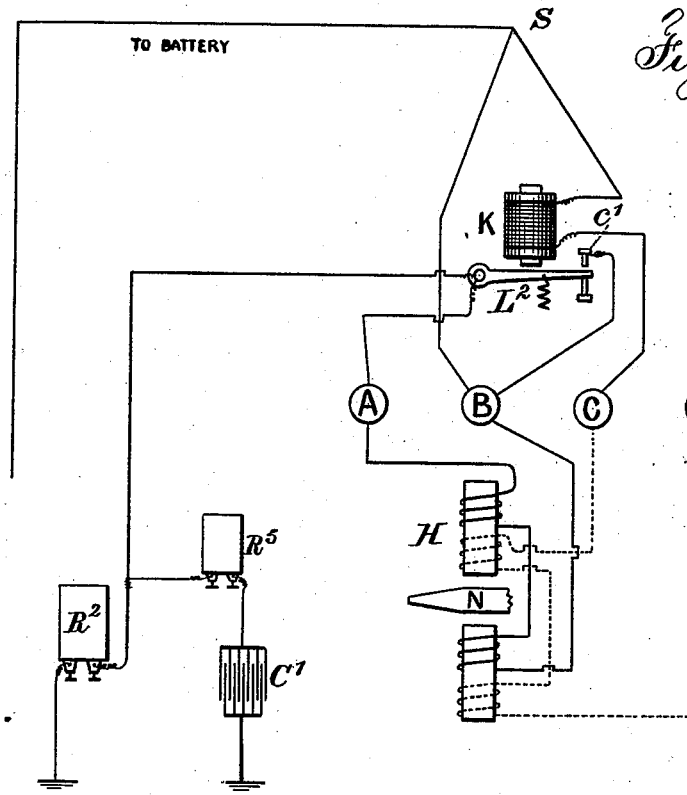
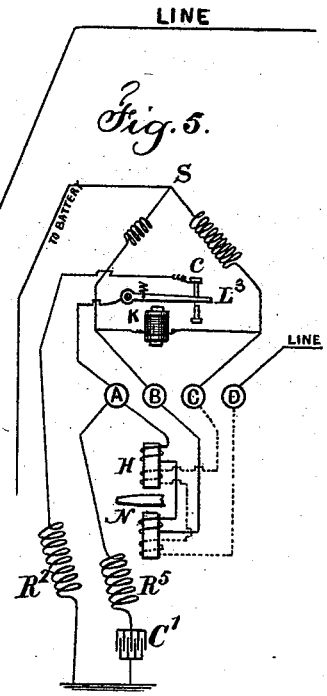
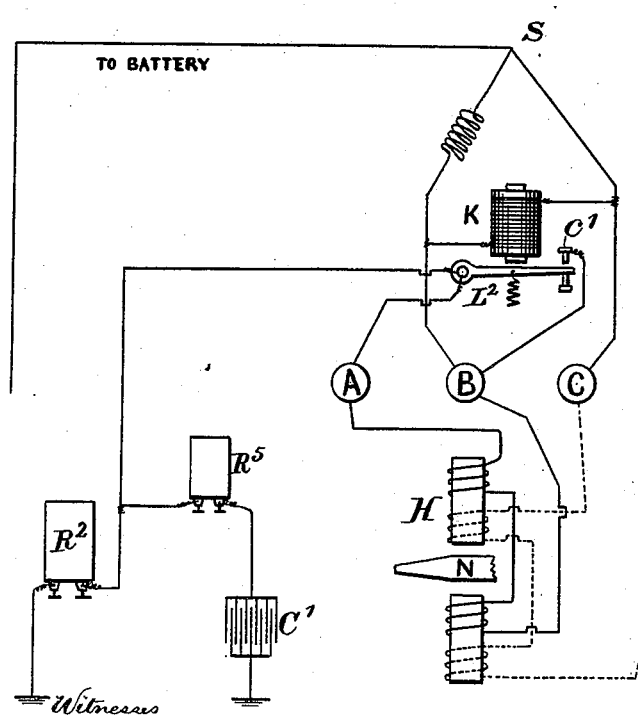
Witnesses
Chas H Smith
J. Staib
Inventor
Charles Thom Jr
per
Lemuel W. Serrell
Atty.

UNITED STATES PATENT OFFICE.

CHARLES THOM, JR., OF BROOKLYN, NEW YORK.

ELECTRIC TELEGRAPHY.

SPECIFICATION forming part of Letters Patent No. 510,209, dated December 5, 1893.

Application filed February 2, 1893. Serial No. 460,741. (No model.)

*To all whom it may concern:*

Be it known that I, CHARLES THOM, Jr., a citizen of the United States, residing at Brooklyn, in the county of Kings and State of New York, have invented an Improvement in Electric Telegraphy, of which the following is a specification.

In duplex and quadruplex telegraphy it is necessary to establish a balance of current strength, that is, to reproduce in an artificial line the conditions which arise on the main line both as to resistance and electrostatic capacity. This artificial line is composed of an adjustable rheostat whose coils are connected at one end with the point where the current splits and at the other end of the coils the circuit is extended to the ground. When the distant end of the line is thrown to the ground the current on the home artificial line passes around the polar relay coils in a different direction from that on the main line coils, thus establishing a balance. In my present improvement there are introduced into the main line circuit the helices of a rapidly acting electro-magnet which operates an armature whose function is that of a circuit breaker with respect to the artificial line; hence the current instead of being divided is passed through the main line coils or artificial line coils alternately, thus rendering the action of the receiving instrument more efficient without requiring a careful balance of the currents between the main and artificial lines.

In the drawings, Figure 1 is a diagram illustrative of the two ends of a line, and Figs. 2, 3, 4 and 5 represent modifications.

Fig. 1 represents the connections at one end of the line marked "New York" and at the other end marked "Buffalo" for convenience. At "New York" the current is indicated as derived from the dynamos A A' and at "Buffalo" as from a battery M B. The pole changer L at the New York end is in the main line between the dynamos and the split S and is represented as a current reversing instrument, and the pole changer R at the other end of the line is connected with the battery M B to reverse the same. Both of these pole changers are so arranged that they place the zinc or negative current to line when they close and a copper or positive current when they open.

It is to be understood that the rheostats $R'$ $R^2$ $R^3$ $R^4$ $R^5$ $R^6$ and the condensers $C'$ $C^2$ are to be introduced in the respective circuits, and the ground connections are to be made in any usual manner and for the well known objects, and that the present improvements are especially available in polar duplex telegraphy, but may be used wherever available in duplex or similar telegraphs. The balance required in these improvements is that the resistance in rheostats $R^2$ and $R^3$ shall be equal to half or about half that of the line for a reason hereinafter stated. The adjustment particularly required is that the springs attached to the armatures $L^3$ $L^4$ of the electro-magnets K K' shall be of such tension that the armature shall not respond when like poles are to the line or to the comparatively slight currents which may result from inequality in the strength of the two batteries or from leakage at one end or the other due to atmospheric or other causes.

Let A B C D represent the binding posts of ordinary differentially wound polar duplex relays forming the receiving instruments H H' at the respective ends, the armature of one being of N polarity, of the other being of S polarity. The main line connections come to D. The connections of the main and artificial coils in the relays pass from D to C and B to A respectively. The ground connections from A pass through the rheostats and condensers at the respective ends. The circuits from the respective pole changers or other transmitters extend to the splits S S'; one wire from each split goes to B and the other one passes through the helices of the magnets K K' to the binding posts C. The artificial line circuit at each end containing the rheostats $R^2$ $R^3$ is connected to the back stops $c$ or $d'$ of the circuit breaking arrangement actuated by the electro-magnet K or K'. Hence the artificial line remains closed until a current is actively employed on the line, but when the electro-magnet K or K' is energized, the artificial line is cut out by the armature moving away from the back stop $c$ or $d'$ to the insulated front stops, so that the entire current is directed through the main line coils of the receiving instruments H or H' instead of being divided at the split S or S'.

In operating a polar duplex, for which the present improvement is especially adapted, the pole changers in their normal condition are adapted to put currents of equal or nearly equal potential and of either polarity to the line.

It is a well known electrical law that there can be no flow of electricity where there is no difference of potential. Hence the batteries being of equal strength with negative poles to the line at both ends or with positive poles to the line at both ends, there will be no current on the main line coils of the polar relays or in the helices K K' and the current at either end will flow through the artificial lines and circuit connections to grounds energizing the artificial line coils of the polar relays.

In the working of a polar duplex, four electric conditions are possible:

|   | New York. | Buffalo. |
|---|---|---|
| 1 | − to line. | − to line. |
| 2 | + " | − " |
| 3 | − " | + " |
| 4 | + " | + " |

In these conditions the receiving instruments will respond to the distant pole changers in the manner now usual in polar duplex telegraphy. In the second and third conditions there being a full current on the main line the electro-magnets K and K' will open or cut out the artificial line at the receiving station, New York, for instance, and throw the full strength of the current through the main line coils of the receiving polarized relay, and this is not opposed as heretofore in the differential system by any current in the artificial line. The voltage of the home and distant batteries is supposed to be equal.

Condition 1. No current in the main line. Electro-magnet K, Fig. 1, is uncharged. Armature $L^3$ makes contact with the back stop c. Current flows from ground through rheostat $R^2$ to c, through $L^3$ to A, through artificial coils to B, to S, to lever of pole changer L, to dynamo A, thence to ground. Its effect is to close the polar relay H.

Condition 2. Current on main line in direction from New York to Buffalo. Electro-magnet K is charged. Contact of $L^3$ with c is broken and artificial line opened. The current from + dynamo, through pole changer to S, through coils K to C, to D, to main line. Its effect is to close the polar relay H.

Condition 3. Current is in a direction the reverse of that in Condition 2. Its effect is to open polar relay H.

Condition 4. Again there is no current on the main line. The contact of $L^3$ with c is restored. The current flows from dynamo A' to the pole changer, to S, to B through the artificial coils to A, to $L^3$, to c, through rheostat $R^2$ to ground. When the contact at C is broken the current flows through the main line coils only; when the contact at c is made the current flows through the artificial line coils only so that the undivided current passes through the main line coils and artificial line coils alternately.

In the pole changer R, Fig. 1, the small square between the two springs represents the near end of a lever operated at the distant or opposite end by an armature and electro-magnet. When the local circuit is closed, the end R of the lever which carries a ground wire as indicated touches the upper spring only; + pole of M B is to ground. At the same time the − pole is to line. When the local circuit is open, end R of the lever touches the lower spring only. The − pole is to ground and the + pole to the line through the points connected by the semicircle of dots. Both of these pole changers are so arranged that they place the zinc or negative current to line when they close and a copper or positive current to line when they open.

For the foregoing reasons the potential of the batteries at the respective ends can be reduced to one-half of that at present used without detriment to the magnetic effect on the relays or to the distinctness of the signals. A great saving in the cost of chemical and dynamo batteries is thus effected. As the division of the outgoing current is avoided the difficulties in balancing and adjusting the instruments are lessened.

The electro-magnets K K' can be of the ordinary character such as are used in a single Morse relay or the relay known as the Freir self-polarizing relay, or for fast speed work they may be the electro-magnets of a polarized relay with an armature suitable for rapid alteration from point to point under the influence of the reversing currents.

In the conditions of the current before mentioned which are the only ones possible, the actions are as follows:

1. New York −; Buffalo −. No current on the main line, and the home and distant batteries being of equal or nearly equal potential, the helices K K' are uncharged. Artificial lines are closed at c and d'. The current flows on the artificial line from ground through resistance $R^2$, i. e. in a direction from the ground equal to one half or about one half that of the line, the magnetic effect of one battery of one hundred volts through two thousand four hundred ohms resistance for instance being the same as that of two batteries of one hundred volts through four thousand eight hundred ohms.

Under Conditions 2 and 3 we have on the main line a current from two hundred volts through four thousand eight hundred ohms. To make the current on the artificial line under Conditions 1 and 4 equal in strength to the currents on the main line under Conditions 3 and 4, we make the resistance in rheostats $R^2$ and $R^3$ each two thousand four hundred ohms; we have then on the artificial lines one hundred volts through two thousand four hundred ohms.

2. New York +; Buffalo —. The current on the main line energizes the helices K K', and opens the artificial lines at $c$ and $d'$. All the current passes to the main line. This leaves New York polar relay closed, and opens the polar relay at Buffalo.

3. New York —; Buffalo +. Converse of 2, opens the polar relay at New York and closes the Buffalo relay.

4. New York +; Buffalo +. No current on the main line. The currents on the artificial lines open both polar relays.

It is to be understood that the positive current on the artificial line is in the direction from S to B through the coils of the polar relay to A, through the back stop $c$, through the rheostat $R^2$ to the ground. It does not pass through the helices K and hence the electro-magnet K does not respond except when a current of maximum strength is set up in either direction on the main line.

In Condition 2 the direction of the current is from New York to Buffalo. In Condition 3 the direction is from Buffalo to New York. Consider now the New York end. When the current is passing on the main line in either direction the electro-magnets K are charged, the lever $L^3$ is attracted and the artificial line is open at $c$. Under these conditions the artificial line coils in the polar relay H are open and therefore inactive.

The method of increasing the magnetic effect is to cause the current under Conditions 2 and 3 to pass through the main line coils and then through the artificial line coils of relay H in the same direction; in other words, the ampère turns are simply doubled and so the magnetic effect is doubled.

Under Conditions 1 and 4, $i.\ e.$ when like poles are to the line the current on the artificial line can be made equal to that on the main line by a suitable resistance in the rheostat $R^2$.

It is understood that in this device the instrument M, Fig. 2, is substituted for the instruments K and K' in the main line circuit, Fig. 1. Its construction is such that when the local circuit is open and the electro-magnets K uncharged, the end 10 of the lever is depressed making contact with the spring 11 which breaks contact with the point 12. At the same time the spring 14 makes contact with the point 15. When the local circuit is closed and the electro-magnets K are charged the end 10 of the lever is raised and contacts made as in the diagram.

Condition 1. New York—to line; Buffalo—. No current on the main line. The current on the artificial line is in the direction from the ground through rheostat $R^2$, to E, to lever L', to A through coils to B, to spring 14 to point 15, to S, thence to zinc pole of the battery. The effect of this is to close the relay H.

Condition 2. New York+to line; Buffalo—. Electro-magnets K are charged; instrument M is closed. The direction of the current is from + pole of the home dynamo to S through coils K to C to D to spring 11 to point 12 to A to B to spring 14 to 10 to main line thence to — pole at distant end. The current is thus made to pass in the same direction round the main and artificial coils in series. The magnetic effect is twice that produced by passing it round the main line coils only. The effect of this current is to close the relay H.

Condition 3. New York—to line; Buffalo +. The direction of the current is the reverse of that in Condition 2. Its effect is to open the relay H.

Condition 4. New York + to line; Buffalo +. No current on the main line. The direction of current on the artificial line is reverse of that in Condition 1. Its effect is to open the relay H. The operation thus indicated is an extension of the principle described in connection with Fig. 1. In Fig. 1 a given current is doubled as to its magnetic effect on the armature of the polar relay as compared with its effect in the differential system. In Fig. 2 a given current is quadrupled in its magnetic effects as compared with the differential system.

In Fig. 5 the helices K are represented in a bridge with resistances that cause the current to divide, a portion going through such helices K, the circuit connections and the operations before described with reference to Fig. 1 remaining unchanged.

Fig. 3 represents a modification of the device hereinbefore described. The arrangement differs from that represented in Fig. 1 in that the artificial line coils of the polar relay are short circuited or shunted by the armature $L^2$ actuated by the helices K. The front stop $c'$ of the armature $L^2$ is connected to the binding post B which is the battery end of the artificial line passing from A through one set of coils in that polar relay to B. The binding post A is connected to the armature $L^2$, thence to the rheostat $R^2$ which has a resistance equal to that of the line. It follows from Ohm's law that I do not reduce the strength of current on a grounded wire of certain resistance by adding to it another grounded wire of the same resistance. With one hundred and twenty volts through a line of four thousand eight hundred ohms I have a current of one-fortieth ampères or twenty-five millampères. If I add another line of four thousand eight hundred ohms at the battery the joint resistance is two thousand four hundred ohms, the current one-twentieth ampère or fifty millampères or twenty-five millampères on each wire.

The transmitting apparatus, $i.\ e.$ the pole changers at the home and distant ends, may be the same in every case as shown in Fig. 1.

When the parts are arranged and connected as in Fig. 3 the operations are as follows:

Condition 1. New York — to line; Buffalo —. No current on main line. Armature $L^2$ is against the insulated back stop. The direction of the current is from the ground through $R^2$, to $L^2$, to A, through artificial line coils to B, to S to — pole of home dynamo. Its effect is to close the polar relay H.

Condition 2. New York + to line; Buffalo —. Current on main line attracts $L^2$ to point $c'$. The direction of the current is from + pole of home dynamo to point S where it divides. One half flows from S through electro-magnet K to C through main line coils to D to main line. The other half flows from S to B. Then instead of passing through the artificial coils to A it passes to $c'$ through $L^2$ to $R^2$ (which has a resistance equal to that of the line) to ground. The current on the artificial line does not oppose its magnetic effects in the relay to those of the main line. Its effect is to close the polar relay H.

Condition 3. New York — to line; Buffalo +. The direction of the current on the main line is from + pole of distant dynamo or battery to D, to C, through coils K to — pole of home dynamo. On the artificial line the direction of the current is from ground through $R^2$ through $L^2$ to $c'$ to B to S to — pole of home dynamo. Its effect is to open polar relay H.

Condition 4. New York + to line; Buffalo +. No current on the main line. The direction of the current is from + pole of home dynamo to S to B through artificial line coils to A to $L^2$ to $R^2$ to ground. Its effect is to open polar relay H.

The shunting of the artificial line coils of the polar relay as described, permits the placing of the helices K that actuate the armature $L^2$ in a bridge between the main and artificial lines, as represented in Fig. 4. In this arrangement when unlike poles are to the line the difference in potential between the main and artificial lines creates a current through the helices K, attracting the armature $L^2$ to the front stop, thus shunting out of the artificial line coils of the polar relay the current on the artificial line before described. When like poles are to the line there is no current on the main line and the opposing electric conditions of the main and artificial lines prevent a current through the helices K, and the home circuit current on the artificial line passes from the battery and key to the coils of the polar relay to A, and thence by $L^2$ to the artificial line rheostat and the ground. In this arrangement as well as in the other arrangements the armature of the electro-magnet K or K' changes the circuit connections so as to prevent the currents on the main and artificial lines from opposing each other in the receiving instrument.

It has been shown that in the differential system when unlike poles are to the line a current of say ninety millampères on the main line is opposed in its magnetic effects by a current of forty-five millampères on the artificial line, so that there is a waste of one half the current on the main line. To prevent this waste—to make every millampère of the current tell on the armature of the polar relay—is the sole object of all the operations delineated in Figs. 1, 3, 4 and 5: First, by opening the artificial line by means of the electro magnet K ($a$) in series with the main line Fig. 1, ($b$) in a bridge Fig. 5; second, by shunting the artificial line coils by means of electro-magnet K ($a$) in series with the main line Fig. 3, ($b$) in a bridge, Fig. 4.

I claim as my invention—

1. The combination in a duplex telegraph of an electro-magnet, the helices of which are in the main line circuit, and an armature and circuit changer actuated by such electro-magnet, such circuit changer being in the artificial line and acting to cut in and out such artificial line, substantially as and for the purposes set forth.

2. The combination in a duplex telegraph, of polarized receiving relays at the respective stations, line and artificial line circuit connections, and circuit reversing keys, and a circuit changing electro-magnet at each station, the helices of which are in the main line circuit, and the circuit changer is in the artificial line circuit, substantially as and for the purposes set forth.

3. The combination in a duplex telegraph of polarized receiving relays at the respective stations, main and artificial line circuit connections and circuit reversing keys and a circuit changing magnet at each station, the helices of which are in the main line circuit and the circuit changer is in the artificial line, and another circuit changing device for throwing the artificial line helices of the polarized relays also into series in the main line circuit, substantially as set forth.

4. The combination in a duplex telegraph having a polarized relay, of an electro-magnet and its armature acting to shunt the coils of the polarized relay in the artificial line, substantially as specified.

5. The combination in a duplex telegraph of helices and a circuit changing armature responding to the increase and decrease of current on the main line, and circuit connections, substantially as specified, to prevent the currents in the main coils of the receiving instruments from opposing the currents in the artificial line coils, as set forth.

Signed by me this 31st day of January, 1893.

CHARLES THOM, JR.

Witnesses:
GEO. T. PINCKNEY,
A. M. OLIVER.